US008688077B2

(12) United States Patent
Fartmann et al.

(10) Patent No.: US 8,688,077 B2
(45) Date of Patent: Apr. 1, 2014

(54) COMMUNICATION SYSTEM AND METHOD FOR PROVIDING A MOBILE COMMUNICATIONS SERVICE

(75) Inventors: Alfons Fartmann, Garching (DE); Günter Schäfer, Berlin (DE); Jürgen Totzke, Poing (DE); Lars Westerhoff, Berlin (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1466 days.

(21) Appl. No.: 11/547,815

(22) PCT Filed: Aug. 29, 2005

(86) PCT No.: PCT/EP2005/054245
§ 371 (c)(1),
(2), (4) Date: Oct. 5, 2006

(87) PCT Pub. No.: WO2006/034935
PCT Pub. Date: Apr. 6, 2006

(65) Prior Publication Data
US 2007/0287422 A1 Dec. 13, 2007

(30) Foreign Application Priority Data
Sep. 30, 2004 (DE) .................. 10 2004 047 692

(51) Int. Cl.
*H04M 1/66* (2006.01)
*H04L 12/28* (2006.01)
*G06F 15/16* (2006.01)

(52) U.S. Cl.
USPC ............ 455/411; 370/351; 370/392; 726/13; 726/2

(58) Field of Classification Search
USPC ................................ 455/411, 403
See application file for complete search history.

(56) References Cited

U.S. PATENT DOCUMENTS

| 6,349,088 | B1 * | 2/2002 | Ginzboorg et al. | 370/230 |
| 6,615,186 | B1 * | 9/2003 | Kolls | 705/26 |
| 7,339,928 | B2 * | 3/2008 | Choyi et al. | 370/390 |
| 2002/0069278 | A1 | 6/2002 | Forslöw | |
| 2002/0183046 | A1 * | 12/2002 | Joyce et al. | 455/414 |
| 2002/0196782 | A1 * | 12/2002 | Furukawa et al. | 370/352 |

(Continued)

OTHER PUBLICATIONS

L. Westerhoff, S. Reinhardt, G. Schäfer, A. Wolisz; "Security Analysis and Concept for the Multicast-Based Handover Support Architecture MOMBASA; Global Telecommunications Conference 2004"; Globecom '04; Nov. 29-Dec. 3, 2004; pp. 2201-2207; XP010757921; ISBN: 0-7803-8794-5; IEEE; Piscataway, NJ, USA.

*Primary Examiner* — Matthew Sams
(74) *Attorney, Agent, or Firm* — Buchanan Ingersoll & Rooney PC

(57) ABSTRACT

The invention relates to a communication system and a method for providing a mobile telecommunication service. A communication network transmits messages on the basis of at least one internet protocol. A network connection computer connects an access network for mobile computers and the communication network. The access network is equipped with several access points comprising corresponding access point connection computers, which are configured to create a communication connection between variable access points and the mobile computers. An authorization verification computer establishes and manages trusted relationships between several communication elements. The network connection computer and the access point connection computer are configured to execute packet filtering during the receipt and transmission of messages for the secure protection of the communication system.

17 Claims, 4 Drawing Sheets

(56) References Cited

U.S. PATENT DOCUMENTS

| | | | |
|---|---|---|---|
| 2003/0007622 A1* | 1/2003 | Kalmanek et al. | 379/219 |
| 2003/0043853 A1* | 3/2003 | Doyle et al. | 370/489 |
| 2003/0119483 A1* | 6/2003 | Jeon | 455/411 |
| 2003/0119484 A1* | 6/2003 | Adachi et al. | 455/411 |
| 2003/0145094 A1* | 7/2003 | Staamann et al. | 709/229 |
| 2003/0157927 A1* | 8/2003 | Yi et al. | 455/411 |
| 2004/0077350 A1 | 4/2004 | Naghian | |
| 2004/0087304 A1 | 5/2004 | Buddhikot et al. | |
| 2004/0122960 A1* | 6/2004 | Hall et al. | 709/229 |
| 2004/0162992 A1* | 8/2004 | Sami et al. | 713/200 |

\* cited by examiner

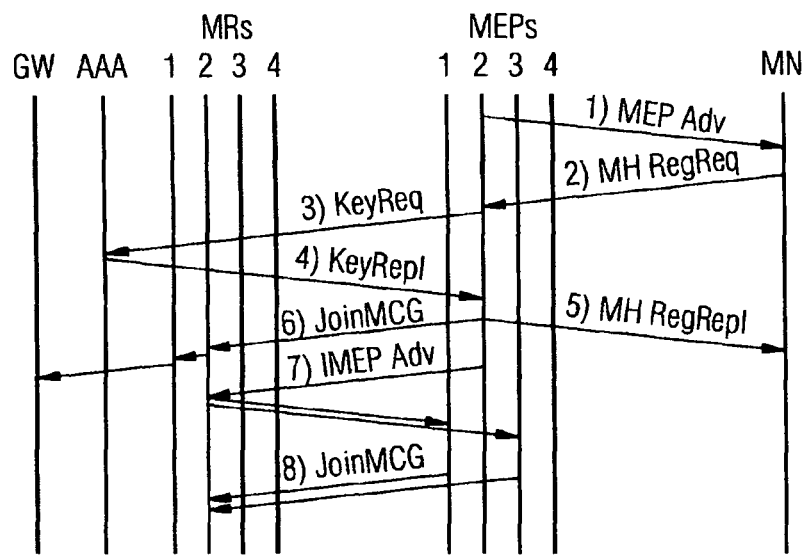
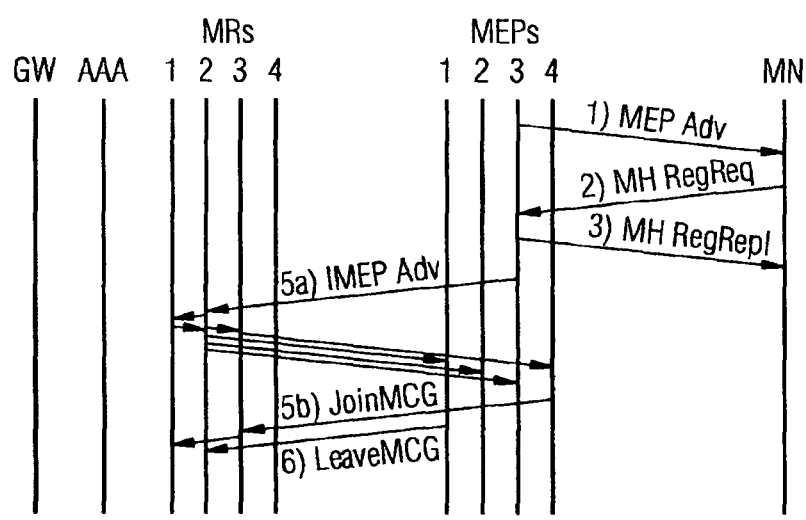

FIG 7

Main Table

| No. | Direction | Source | Destination | Correlation | Action |
|---|---|---|---|---|---|
| 1 | incoming | external | message transfer (MH) | -m pool -dst pool active | accept |
| 2 | incoming | external | message transfer (MH) | -m limit -limit 10/s -limit-burst 2 | -j idle |
| 3 | incoming | any | any | ----- | reject |

Idle Table

| No. | Direction | Source | Destination | Correlation | Action |
|---|---|---|---|---|---|
| 1 | incoming | any | any | ----- | -j pool-pool active -add-dst-ip |
| 2 | incoming | any | any | ----- | accept |

COMMUNICATION SYSTEM AND METHOD FOR PROVIDING A MOBILE COMMUNICATIONS SERVICE

CROSS-REFERENCE TO RELATED APPLICATIONS

This application is the US National Stage of International Application No. PCT/EP2005/054245, filed Aug. 29, 2005 and claims the benefit thereof. The International Application claims the benefits of German application No. 10 2004 047 692.6 DE filed Sep. 30, 2004, both of the applications are incorporated by reference herein in their entirety.

FIELD OF INVENTION

The present invention relates to a communication system and a method for providing a mobile communication service by means of a communication network which is configured to transmit messages on the basis of at least one Internet protocol, and by means of an access network for mobile computers within which a message is transmitted using a multicast process.

BACKGROUND OF THE INVENTION

Some existing communication systems for providing a mobile telecommunication service utilize a communication network which is configured to transmit messages on the basis of at least one Internet protocol. However, it has been usual hitherto to use Internet protocol-based communication only within a core network, so that it continues to be necessary to use dedicated communication protocols to provide mobile communication services. A communication network which operates on the basis of an Internet protocol permits internetworking packet-oriented data exchange between terminal systems of the communication system. Thus, a communication protocol is provided which makes possible internetworking transmission of messages between geographically dispersed computers of different networks.

A specification which makes possible mobile telecommunication services on the Internet has been presented by the Internet Engineering Task Force (IETF). The main starting point in specifying the "Mobile IP" concept presented was the shortcomings of a conventional Internet protocol (IP) with regard to mobility. "Mobile IP" makes available a solution for mobility on the Internet which is scalable, robust and secure. In particular, mechanisms for the routing of IP packets to mobile computers are made available which can reside in a foreign network while retaining their permanent IP address. A problem of "Mobile IP" is that the basic concept is not suited to supporting automatic tracking of an existing useful data connection, the so-called "seamless handover".

An architecture for a communication system called "MOMBASA" which operates on the basis of the Internet protocol is presented, in particular, in A. Festag, L. Westerhoff and A. Wolisz, The MOMBASA Software Environment—a Toolkit for Performance Evaluation of Multicast-based Mobility Support, in Proc. of Performance Tools 2002, pages 212-219, London, GB, April 2002. In this communication system an access network for a mobile computer operates by using a multicast process to transfer the individual messages. In point-to-multipoint communication, multicasting is a process in which a message is transmitted with a group address to a fixed group or class of recipients in one transmission process.

An infrastructure of the MOMBASA communication system provides the following components as communication elements: in the access network for the mobile computer a plurality of access points each having a respective access point connection computer (called mobility-enabling proxies) and being connected to one another via multicast-capable routers are provided. A network connection computer, for example, in the form of the gateway, serves to connect the access network to the public or private fixed Internet network. The so-called mobile agents or mobility agents, which represent a network authority used to support the mobility of the mobile computers in individual subnetworks, are implemented by the mobile computers.

A mobile computer must be able to communicate with other computers even after changing of the access point to the Internet. For this purpose a globally reachable IP address located within the address area of the access network is allocated to mobile computers, at least for the duration of their visit to an access network. Consequently, all message packets from the public Internet network which are addressed to the mobile computer are sent via normal Internet routing to the network connection computer for connection to the access network. A block of unicast addresses of a plurality of mobile computers is allocated to a block of multicast groups within the access network. If a mobile computer registers at an access point connection computer, this access point connection computer becomes part of an allocated multicast group. At the network connection computer for connecting the access network to the Internet network a message packet for a mobile computer is transmitted to a defined group of access points, and from the allocated access point to the mobile computer.

The use of a multicast process within the access network simplifies the process of predictive tracking of an existing useful data connection between two access points. Starting from the access point connection computer at which the mobile computer is directly registered, adjacent access point connection computers become part of a multicast group. These computers store data in a ring buffer; in the tracking of an existing useful data connection, called the handover, the messages received downstream are transmitted onwards in the ring buffer to the mobile computer in order to compensate for a loss of messages during the handover.

In the event that a mobile computer neither receives nor transmits data for a certain length of time, the mobile computer switches to idle mode. This is an operating state in which the mobile computer, although switched on, has not yet logged on and therefore cannot yet be reached from the access network. In this case a multicast group concerned is dismantled and the position of a mobile computer is known in only a rudimentary fashion as a paging area, represented by a permanent multicast group which is independent of the mobile computer. If messages for a mobile computer which is in the idle state are received at the network connection computer, a paging request is transmitted to a defined multicast group of the last known paging area of the mobile computer and transferred to the last-addressed access point connection computers of this paging area, whereby the mobile computer is switched to the active state and logs on to the access network.

Such a communication system is exposed to a considerable number of security threats which endanger the operation of the mobile telecommunication service. Firstly, the internal exchange of messages within the access network can be endangered by external attacks from external links. Furthermore, the internal exchange of messages within the access network can be used by an attacker, who can gain access to the access network in various ways. In addition, messages or information can be tapped of manipulated by an attacker during their transmission, if the attacker purports to be a legitimate user of the access network. The attacker could additionally use this to utilize a telecommunication service at the expense of a personified mobile computer.

In general, a mobile computer does not know in advance which of the access points in the access network is responsible for it. For this reason falsified so-called advertisements, i.e. messages with which mobility agents offer their services to the mobile computer and which are produced via the access point last used, can cause the mobile computer to erroneously register itself with an attacker. Here the problem is as follows: the so-called MEP advertisements (Mobility-Enabling Proxies advertisements) are not designed for a single mobile computer but for a group of mobile computers. In the event of use of symmetrical encryption, it would be possible for each mobile computer involved to produce falsified advertisements. However, if an asymmetrical cryptographic method were used, this would mean that checking values of, at present, several hundred to 2048 bits would have to be used. Nevertheless, a false access point could potentially still be unmasked later during the registration process if the mobile computer and the access point communicated directly with one another.

So-called denial of service attacks are a further threat which should be mentioned. Here, denial of service means the same thing as functional failure or denial of function. This includes a large number of different possible attacks which all have the aim of causing certain computers to crash or to be disabled in certain functions. Such attacks can be directed, from the access point last used, against an authentication process itself, at a time in which authentication of the identity of the data transfer point (called the peer node) cannot be guaranteed. Furthermore, denial of service attacks can be executed from the Internet by the use of data packets. If data packets are sent to a plurality of mobile computers in the idle state (for example, with varying sources and protocols) they are addressed simultaneously by a paging request and caused to switch to the active mode. This leads to a signal overload within the access network and at an authentication verification computer for executing authentication, authorization and accounting (an AAA server).

SUMMARY OF INVENTION

It is the object of the present invention to specify a communication system and a method for providing a mobile telecommunication service of the type mentioned in the introduction, with which suitable precautionary measures against such security threats can be taken and which, furthermore, are suitable for automatically tracking an existing useful data connection.

This object is achieved by a communication system for providing a mobile telecommunication service and by a method for providing a mobile telecommunication service as claimed in the claims.

The communication system for providing a mobile telecommunication service according to the invention comprises a plurality of communication elements: a communication network is configured to transmit messages on the basis of at least one Internet protocol. In addition, there is provided at least one mobile computer and an access network for the mobile computer in which messages are transmitted using a multicast process. A network connection computer is used to connect the access network to the communication network. In the access network there are provided a plurality of access points each having respective access point connection computers which are configured to be able to establish a communication connection between variable access points and the mobile computer. An authentication verification computer is used to establish and manage trusted relationships between a plurality of the communication elements. The network communication computer and the access point connection computer are configured to execute a packet filtering method when receiving and transmitting messages for security-related protection of the communication system. In addition, the network connection computer and the authentication verification computer are configured to execute an overload control method by providing a communication protocol for the communication elements, in order to prevent malfunction of one of the communication elements as a result of an attack.

According to the invention, therefore, a packet filtering method is executed when receiving and transmitting messages for security-related protection of the communication system at the boundaries of the access network. In addition, trusted relationships between a plurality of communication elements of the communication system are established and managed and, in addition, an overload control is executed by providing a communication protocol for the communication elements of the communication system, in order to prevent malfunction of one of the communication elements as a result of an attack. The combination of these different technical measures offers, in particular, the following advantages: with the packet filtering method for security-related protection of the communication system at the boundaries of the access network an internal exchange of messages within the access network can be protected from external attacks. With the overload control, above all denial of service attacks against the authentication verification computer and the network connection computer can be repelled. In particular, the overload control method is executed in an initial registration process of the mobile computer and/or when performing or updating paging services. These operations must be carried out via the authentication verification computer or the network connection computer. The overload control (called Rate-based Congestion Control) can be implemented using Linux net filter architecture, so that it can be integrated to a high degree with the packet filtering process. The overload control method can also be executed on several levels, in particular decentrally on a level of geographical cells and centrally on a level of the total network load. A negative effect of the overload control method on legitimate users of the communication system can thereby be reduced to a minimum.

According to a further advantageous embodiment of the invention, by means of a distribution of keys to adjacent communication elements of an access point of the access network, it is made possible for a further access point to execute local authentication of a mobile computer when automatically tracking an existing useful data connection. A signal stream to a central authentication verification computer is thereby avoided and at the same time the increase in handover latency as a result of the authentication process is minimal. Through the decentralized handling of handover processes, denial of service attacks against the authentication verification computer are avoided or repelled, without detriment to a legitimate user.

To summarize, the invention makes available effective protection against security threats in a communication system of the type mentioned in the introduction, without significantly increasing handover latency. A negative effect of the overload control on legitimate users is minimized.

Concerning the implementation of the packet filter method, an advantageous embodiment of the invention provides that the network connection computer and the access point connection computer are configured to execute a packet filtering method in order to repel a predetermined class of attacks which use deliberately changed source addresses. It should be taken into account in this connection that source addresses of a mobile computer must appear only from the direction of the wireless link, while source addresses of non-mobile elements and of communication elements which do not belong to the access network must be transmitted only via the network connection computer.

Further advantageous embodiments and developments of the invention are specified in subclaims.

BRIEF DESCRIPTION OF THE DRAWINGS

The invention is explained in more detail below with reference to the figures, which represent advantageous embodiments of the present invention and in which:

FIG. 3 shows the initial registration process of a mobile computer on a communication system according to the invention;

FIG. 4 shows an example of a handover process of a mobile computer when changing between different access points;

FIG. 7 is an exemplary table regarding the filtering of denial of service attacks at a network connection computer.

DETAILED DESCRIPTION OF INVENTION

Figure 1:
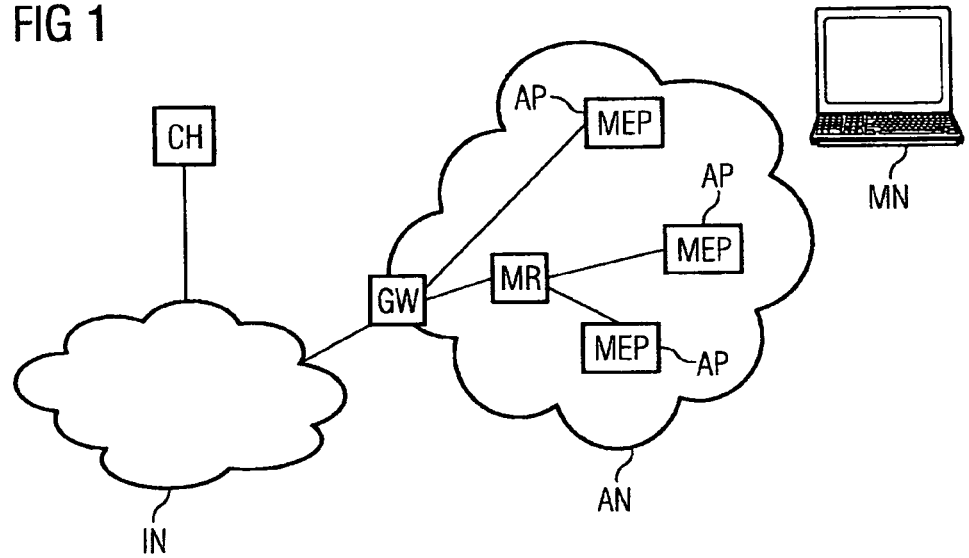
FIG. 1 is a diagrammatic overview of a basic structure of a MOMBASA communication system.

FIG. 1 shows an exemplary architecture of a MOMBASA communication system which comprises a plurality of communication elements. A communication network IN serves to transfer messages on the basis of at least one Internet protocol and is therefore configured, in particular, as an Internet network. In addition, there is provided an access network AN for a mobile computer MN in which messages are transmitted using a multicast process. In point-to-multipoint communication, multicasting is a process in which a message is transmitted with a group address to a defined group or class of recipients in one transmission process. In the access network AN there are provided a plurality of access points AP, each having a respective access point connection computer MEP (Mobility-Enabling Proxies), which are each configured to be able to establish a communication connection between variable access points AP and the mobile computer MN. A network connection computer GW in the form of a gateway is used to connect the access network AN to the Internet network IN. For a communication connection between two terminal devices, a connection between the correspondence computer CH and the mobile computer MN, for example, is established via the Internet network IN and the access network AN. Two of the access points AP with associated access point connection computers MEP are connected to one another via a multicast router MR. To establish a communication connection, mobility agents, which are used to support the mobility of the mobile computer MN when changing access points, are implemented by the mobile computer MN.

According to the invention the network connection computer GW and the access point connection computers MEP are configured to execute a packet filtering method for security-related protection of the communication system when receiving and transmitting messages. In particular, the packet filtering method is executed in order to repel a predetermined class of attacks which use deliberately changed source addresses. It should be taken into account in this connection that source addresses of mobile computers must appear only from the direction of the wireless link, whereas source addresses of non-mobile communication elements and of communication elements which do not form part of the access network are transmitted only via the network connection computer GW.

At the network connection computer GW messages of the wireless link and paging requests should be rejected unless they originate from the network connection computer GW itself. If a message arrives from the Internet network it should be rejected if it contains a source address of a mobile computer or of the access network or is a MOMBASA-internal message, or is a message conforming to the Internet Group Management Protocol (IGMP) or to the Independent Multicast-Sparse Mode (PIM-SM) protocol, which designates a multicast address which is used internally by the access network. At the access points AP the following message packets should be rejected if they originate from the wireless link: every message packet which designates a source address of a non-mobile communication element, inter-MEP advertisements, paging requests, updates of paging services (paging updates) and every IGMP- or PIM-SM-based message which designates a multicast address which is used internally by the access network. Messages of the wireless link should be rejected if they arrive at the upstream interface.

The following message packets should be generated only by an access point; however, they should not be transmitted onwards by the access point, i.e. they should be rejected, if they arrive at an input-side interface: advertisements from access point connection computers MEP, responses to message communications with respect to the registration process (MH registration response, MH: message handling), IGMP Membership Reports and IGMP Leave Groups.

The packet filtering method is a relatively simple variant of a firewall for protecting the communication system. The packet filtering method is not designed to protect the mobile computer from attacks, but is provided only to protect the internal message exchange within the access network from external attacks.

Figure 2:
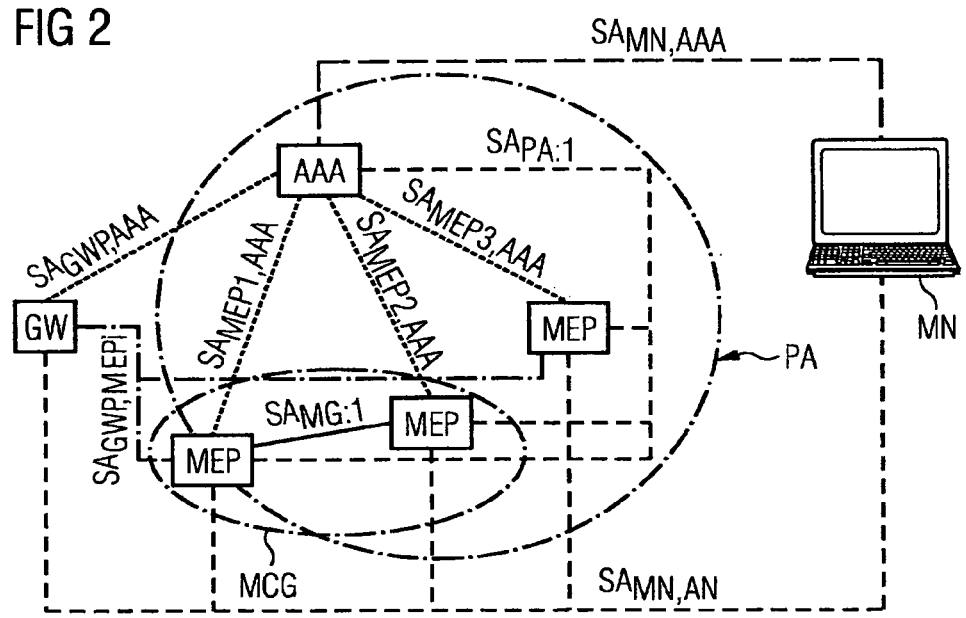
FIG. 2 is a further schematic representation of such a communication system, representing trusted relationships between the individual communication elements.

FIG. 2 is a further illustration according to which an authentication verification computer in the form of an AAA server continues to be provided in the communication system according to the invention. This is a multifunctional communication server for providing services for authenticating persons or users, for verifying the entitlement of these persons to access to particular applications and resources (authorization), and for logging the activities (accounting) of these persons. According to the invention, therefore, a trust model is introduced in order to offer telecommunication services only for legitimate users. For this purpose the mobile computers are authenticated and authorized if they wish to use the service level requested by them. Message transmissions must be secured against falsification and manipulation, and security-critical contents must additionally be secured against tapping, for example, in the form of a "listening attack".

For this purpose a security architecture is used which utilizes, in particular, a method for symmetrical cryptography, for example, by means of so-called cryptographic hash functions and symmetrical encryption. In symmetrical encryption a message is subjected to an encryption operation. Here, in addition to the message itself, the key is a further input value of the encryption operation. The encrypted message (cryptogram) can be transmitted via a non-secure channel and decrypted at the recipient end by means of the key. To make this process reversible, sender and recipient must agree, among other things, on a key which must be exchanged via a secure channel before commencement of the operation.

The security architecture of the present invention distinguishes between permanent and temporary trusted relationships. In this case at least one of the following permanent trusted relationships is established and managed via the authentication verification computer AAA:

- trusted relationships $SA_{MEP:i,AAA}$ between each of the access point connection computers MEP and the authentication verification computer AAA;
- trusted relationships $SA_{GWP,AAA}$ between the network connection computer GW and the authentication verification computer AAA;
- trusted relationships $SA_{GWP,MEP:i}$ between the network connection computer GW and each of the access point connection computers MEP;
- trusted relationships $SA_{MG:i}$ between access point connection computers MEP of a group MCG of access point connection computers MEP;
- trusted relationships $SA_{PA:i}$ between communication elements in a network area PA (paging area) established for receiving a uniform paging service.

The trusted relationships $SA_{MG:i}$ are known only to the members of a respective group MGC and the trusted relationships $SA_{PA:i}$ only to the members within a paging area $PA:_i$.

In addition, a permanent trusted relationship $SA_{MN:i,AAA}$ between the authentication verification computer AAA and the mobile computer MN is established and managed by the authentication verification computer AAA. This is done for each mobile computer which is logged on to the access network AN. During the initial registration of the mobile computer MN a temporary trusted relationship $SA_{MN:i,AN}$ between the mobile computer MN and at least one of the communication elements MEP, GW of the access network AN is established and managed by the authentication verification computer AAA. For external users the local AAA server can contact other AAA servers of other communication networks to establish respective trusted relationships.

Various steps for securing protocol operations within a MOMBASA communication system are described in more detail below.

When a mobile computer executes an initial registration on an access network of a MOMBASA communication system, a message sequence for this operation is executed, as shown in an exemplary manner in FIG. 3.

In a first step the access point connection computers MEP send regular advertisement messages to a so-called challenge/response mechanism. This is an authentication method which can be executed with symmetrical and asymmetrical encryption algorithms. In the method, any desired number, the so-called challenge, is transmitted by the authenticating party to the party to be authenticated. The party to be authenticated takes account of this challenge when calculating its authentication value of the transmitted MH registration request, in order to prevent so-called replay attacks. A replay attack is an active attack in which the attacker replays data obtained in an earlier session at a later time in the system in order to reach the desired information. Without the challenge/response mechanism it would be possible for an attacker to spy on valid, i.e. authenticated, MH registration requests and replay them at another access point connection computer or at a later time. With the challenge/response mechanism, by contrast, an attacker can replay the MH registration request only at the same access point connection computer MEP as the legitimate mobile computer, and can do so only within a short time in which, in effect, he repeats the request in place of the legitimate user. Step 1 is represented in FIG. 3 by "MEP Adv".

In a second step the mobile computer sends an MH registration request containing the last challenge which was incorporated in an MEP advertisement and was authenticated with the trusted relationship $SA_{MN:i,AAA}$ (MH RegReq).

In a third step (KeyReq) an access point connection computer MEP checks the validity of the challenge. However, the access point connection computer MEP cannot determine whether the message has been modified by an attacker. The access point connection computer MEP sends a key request requesting a key to the AAA server, which request contains the original request and additional changes to the requested parameters (for example, limited lifetime as a result of a local principle). The message is authenticated with the trusted relationship $SA_{MEP:i,AAA}$.

In a fourth step (KeyRepl) the authentication verification computer AAA checks the message authentication code MAC of the message originating from the mobile computer and the message authentication code MAC that has been generated by the access point connection computer MEP for the whole message, and verifies that the requested telecommunication service is permitted for the mobile computer according to its profile. The authentication verification computer AAA creates the session trusted relationship $SA_{MN:i,AN}$, encrypts the session key with the trusted relationship $SA_{MEP:i,AAA}$ and generates the MH registration response, authenticated with the trusted relationship $SA_{MN:i,AAA}$, which contains in encrypted form the session key for the mobile computer. The MH registration response is transmitted back to the requesting access point connection computer MEP.

In a fifth step (MH RegRepl) the access point connection computer MEP transmits the MH registration response that was contained in the key response, decrypts the session key and logs the mobile computer into its database.

In a sixth step (JoinMCG) the access point connection computer MEP becomes a part of the multicast group MCG which is associated with the mobile computer, and sets up a message transmission for the mobile computer.

In a seventh step the access point connection computer MEP inserts the mobile computer and its service class and its session key, encrypted via the trusted relationship $SA_{MG:i}$, into the next advertisement between the access point connection computers MEP, which trusted relationship $SA_{MG:i}$ has been sent to the adjacent MEP multicast group (IMEP Adv).

In an eighth step (JoinMCG) the adjacent access point connection computers MEP generate a database entry of the mobile computer containing the trusted relationship $SA_{MN:i,AN}$ when they receive the inter-MEP advertisement, become a part of the multicast group associated with the mobile computer and begin to buffer the message transfer for the mobile computer.

The securing of messages with a message authentication code MAC ensures that only legitimate users receive a telecommunication service, and that messages cannot be modified without this being detected. The encryption of security-critical information and the use of message authentication codes within the access network protect against attackers who are able to tap a link in the internal access network if they are not able to compromise an access network junction.

A handover process to a new access point connection computer MEP is explained in more detail below with reference to FIG. 4.

In a first step the necessity for a handover is ascertained by the mobile computer, in that MEP advertisements are received by a new access point connection computer MEP (MEP Adv).

In a second step (MH RegReq) the mobile computer sends an MH registration request with the last challenge which was recorded in an MEP advertisement. Once a session has been set up in the access network, the message is authenticated with the trusted relationship $SA_{MN:i,AN}$.

In a third step (MH RegRepl) the following operation is executed: normally the new access point connection computer MEP is one of the adjacent MEPs of the old access point connection computer MEP and is therefore already in possession of the session key of the incoming mobile computer. The new MEP can therefore check the message authentication code MAC locally and generate an MH registration response which is signed with the trusted relationship $SA_{MM:i,AN}$. If the new access point connection computer MEP has no entry for the incoming mobile computer, an error is indicated to the mobile computer, so that the latter must execute an initial registration process in this case.

In a fourth step the new access point connection computer MEP sets up a transmission for the mobile computer and empties its buffer memory to compensate for message loss during the handover process.

In a fifth step (steps 5a and 5b) the process continues as in the case of the initial registration.

In a sixth step (Leave MCG) the access point connection computers MEP which are adjacent to the old MEP but not to the new MEP leave the multicast group MCG. In addition, they delete the entry with the trusted relationship when they receive the next inter-MEP advertisement of the old access point connection computer MEP which is no longer connected to the mobile computer.

Figure 5:
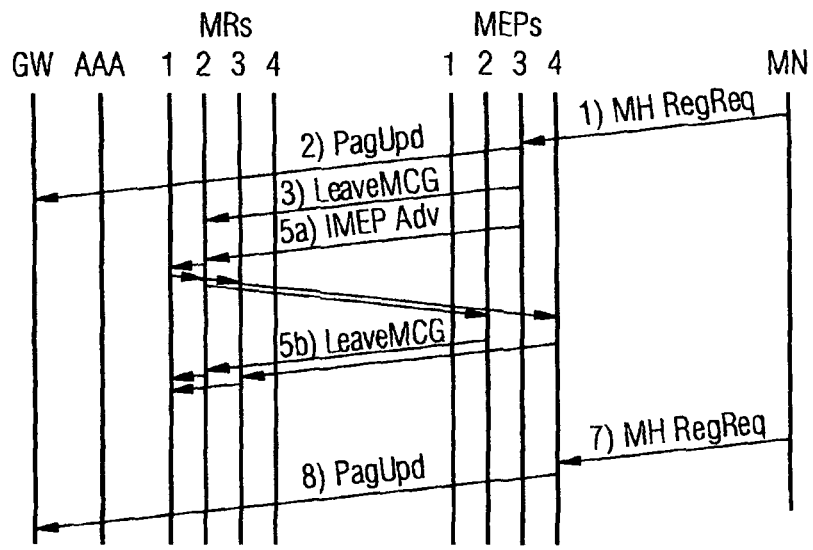
FIG. 5 shows switching of the mobile computer to the inactive state and a paging update process.

A transition of the mobile computer to the inactive state is described in more detail below with reference to FIG. 5.

In a first step (MH RegReq) the mobile computer sends an MH registration request, with a flag set at inactive and authenticated with the trusted relationship $SA_{MN:i,AN}$, to the currently allocated access point connection computer MEP.

In a second step (PagUpd) the latter checks the message and sends a paging update with the corresponding paging area and the encrypted session key of the mobile computer, authenticated with the trusted relationship $SA_{GWP,MEP:i}$, to the network connection computer GW (gateway proxy).

In a third step (Leave MCG) the access point connection computer MEP leaves the multicast group MCG and deletes the entry of the mobile computer.

In a fourth step the network connection computer GW checks the message and generates a paging entry for the mobile computer.

In a fifth step (steps 5a, 5b) the adjacent access point connection computers MEP remove the entry of the mobile computer and leave the multicast group MCG as a result of communication traffic between the access point connection computers MEP.

In this case a paging update is executed as follows: the mobile computer in the idle state regularly refreshes its location, but with a lower frequency than in the active state. To this end, as explained in more detail with reference to FIG. 5, the following steps are executed:

The mobile computer transmits an MH registration request (MH RegReq) with an inactive flag, authenticated with the trusted relationship $SA_{MN:i,AN}$. Since the access point connection computers MEP do not record every status regarding a mobile computer in the idle state, the receiving access point connection computer MEP cannot verify the validity of the message. For such messages an overload control method might be used. Such a method is implemented, for example, by so-called Rate-based Congestion Control, in order to repel denial of service attacks against the network connection computer GW.

In the next step (PagUpd) the message is transmitted as a paging update to the network connection computer GW, where it is validated. The paging entry in the network connection computer GW is updated.

A transition from inactive status to active status can be triggered by two events: the mobile computer wants, for example, to transmit messages; or messages intended for the mobile computer reach the network connection computer. In the first case an initial registration, as described above, is executed by the mobile computer; in the second case a paging process is executed for the mobile computer by the network connection computer.

Figure 6:
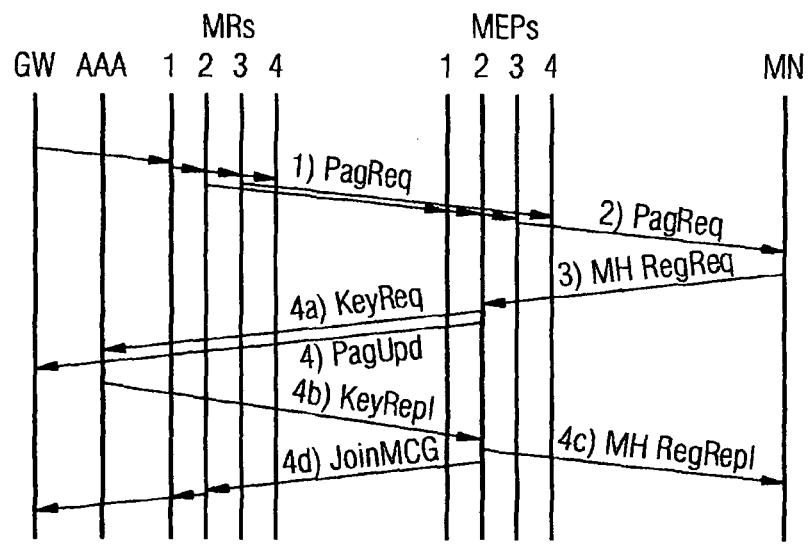
FIG. 6 shows an example of a paging process.

A paging process is described in more detail below with reference to FIG. 6. If messages for a mobile computer MN arrive in the idle state, a paging process is executed by the network connection computer GW in the following manner:

In a first step (PagReq) the network connection computer transmits in a multicast process paging requests, authenticated with the trusted relationships $SA_{MN:i,AN}$ and $SA_{PA:i}$, to the paging area last transmitted.

In a second step (PagReq) all the access point connection computers MEP within the paging area check the paging request, strip off the $SP_{PA:i}$ authenticator and transmit the paging request to the access points last used.

In a third step (MH RegReq) the mobile computer verifies the paging request and executes an initial registration with an additional so-called wake-up flag.

In a fourth step (steps 4, 4a-4c), in addition to the operations relating to the initial registration, a paging update, signed with the trusted relationship $SA_{GWP,MEP:i}$ and with a lifetime of zero, is transmitted by the access point connection computer MEP to the network connection computer GW.

In a fifth step the network connection computer GW modifies the paging update and completes the paging process.

With regard to its security-relevant architecture, the communication system according to the invention continues to be configured to repel or prevent denial of service attacks. For this purpose the network connection computer GW and the authentication verification computer AAA continue to be configured to execute an overload control method by providing a communication protocol for the communication elements GW, MEP, AAA and MN, in order to prevent malfunction of one of these communication elements as a result of a denial of service attack. After the authentication of the user has been executed, as described above, decentrally at the access point connection computers MEP in the case of a handover process, attacks against the central authentication verification computer AAA can be avoided, so that a malfunction would have only a local effect. Such an effect might also be caused by simpler processes, such as data congestion. On the other hand, processes such as initial registration, paging updates during idle periods and the wake-up sequence, must be executed via the authentication verification computer AAA, because permanent storage of divided secrets at a non-central location would mean greater vulnerability for the architecture.

To repel denial of service attacks, the authentication verification computer AAA is advantageously so configured that it executes an overload control process according to a token bucket process. The purpose of an overload control process (for example, so-called Rate-Based Congestion Control according to H. Ohsaki et al., Rate-Based Congestion Control for ATM Networks. Computer Communication Review, ACM SIGCOMM, vol. 25, no. 2, April 1995, pp. 60-72) is to prevent the messages transferred by transmitting units from overloading the capacity of the network. A method having this purpose is the token bucket algorithm, which is a method for smoothing traffic with the aim of shaping data traffic having a discontinuous traffic characteristic as far as possible in such a way that approximately continuous data streams are produced. Token bucket operates with an intermediate memory (bucket) having limited volume. A token generator generates entitlement symbols, so-called tokens, at a constant rate. Incoming data is stored in the bucket. For each token a corresponding quantity of data is released from the bucket. If more is continuously transmitted than agreed, the bucket overflows, i.e. data losses result.

Such overload control (rate control) can be achieved with the Netfilter/IP tables architecture of a standard Linux kernel. FIG. 7 shows a table representing rules which are necessary to limit the number of message packets. In this context, message packets which cause paging requests must be limited, preferably to a number of 10 per second and with a burst length of 20. The net filter makes available a module which allows IP addresses to be dynamically inserted into, and removed from, a pool of addresses within a given area. This can be used to distinguish mobile computers with idle status from active mobile computers. The table shown in FIG. 7 presupposes a pool designated the active pool which initially contains all the addresses of mobile computers, the mobile computers in the idle state being removed from the pool by the network connection computer GW.

When an incoming message packet arrives at the network connection computer GW it is determined whether it agrees with rule no. 1 in the main table. If the destination address is contained in the active pool (-m pool: load module pool, -dst pool active: find destination address in pool active), it is accepted. Rule no. 2 is applied only to message packets which are directed to mobile computers in the idle state. This rule can be executed only 10 times per second with a burst rate which is twice the refresh rate, i.e. 20 message packets (-m limit: load module limit, -limit 10/s: restriction to 10/s, -limit-burst 2: burst length 20 packets). If the rule is applicable, the process is continued in the Idle table (-j idle). All other message packets which are not applicable to rule no. 1 and rule no. 2 are applicable to rule no. 3 and are rejected.

Rule no. 1 in the Idle table ensures that the destination of the message packet is added to the active pool (-j pool: execute pool operation, -pool active -add-dst-ip: add destination address of packet to active pool). The reason for this is that additional message packets to the same destination do not trigger a further paging process but are buffered in a ring buffer by the network connection computer GW. For this reason they can be treated by the packet filter in the same way as message packets to active mobile computers. Rule no. 2 causes the message packet to trigger the paging process in order to be accepted.

Operations which are affected by rate control are not time-critical. An initial registration generally takes place only when the communication network is contacted for the first time, a paging process generally takes place at the start of the communication session, and in any case paging update messages transmit the position of the mobile computer in only a rudimentary manner. For this reason a certain delay time as a result of overload control is acceptable even at high network load. Naturally, in a situation in which a denial of service attack is taking place, legitimate users are also affected, but only with regard to the operation which is currently being used for the attack. A denial of service attack, which without the invention would affect the whole access network and the users logged therein, is thereby limited locally. According to the invention such an attack is limited to those users who are currently inactive, and to users who are attempting to execute an initial registration process.

The invention claimed is:

1. A communication system for providing a mobile telecommunication service, comprising:
    a communication network configured to transmit messages based upon an Internet protocol;
    a mobile computer;
    an access network for the mobile computer in which messages are transferred using a multicast process;
    a network connection computer that connects the access network to the communication network;
    a plurality of access points in the access network, each access point having at least one respective access point connection computer configured to establish a communication connection with the mobile computer; and
    an authentication verification computer for establishing and managing trusted relationships between a plurality of communication elements;
    wherein the network connection computer and the access point connection computer are each configured to execute a packet filtering method for security-related protection of the communication system when receiving and transmitting messages;
    the packet filtering method executed by the access point connection computers comprising:
        determining a source address of a message, and
        rejecting the message if that message has at least one access point connection rejection characteristic, the at least one access point connection rejection characteristic being at least one of a source address identifying a non-mobile communication element that originates from a wireless link, message information that indicates the message arrives at an upstream interface and originates from a wireless link, and the message is an advertisement message from an access point that arrives at an input-side interface and originates from a wireless link;
    the packet filtering method executed by the network connection computer comprising:
        determining a source address of a message, and
        rejecting the message if that message has at least one network connection rejection characteristic, the at least one network connection rejection characteristic being at least one of the source address of the message indicates the message is from a mobile computer, the source address of the message indicates that the message is from the access network, the source address of the message indicates the message is a MOMBASA-internal message, the message conforms to the Internet Group Management Protocol, and the message conforms to the Independent Multicast-Sparse Mode protocol; and
    wherein the network connection computer and the authentication verification computer are configured to execute an overload control method by providing a communication protocol for the communication elements in order to prevent a malfunction of the communication elements as a result of an attack.

2. The communication system as claimed in claim 1, wherein the packet filtering method executed by the network connection computer and the packet filtering method executed by the access point connection computers are also configured to repel a predetermined class of attacks which use deliberately changed source addresses.

3. The communication system as claimed in claim 2, wherein the packet filtering method executed by the network connection computer and the packet filtering method executed by the access point connection computers are also configured to protect an internal message exchange within the access network from external attacks.

4. The communication system as claimed in claim 1, wherein the authentication verification computer is configured to establish and manage at least one permanent trusted relationship:
between each of the access point connection computers and the authentication verification computer, or
between the network connection computer and the authentication verification computer, or
between the network connection computer and each of the access point connection computers, or
between communication elements in a network area which are configured to receive a uniform paging service.

5. The communication system as claimed in claim 1, wherein the authentication verification computer establishes and manages a permanent trusted relationship between the authentication verification computer and the mobile computer.

6. The communication system as claimed in claim 1, wherein during an initial registration of the mobile computer, the authentication verification computer establishes and manages a temporary trusted relationship between the mobile computer and at least one of the communication elements.

7. The communication system as claimed in claim 1, wherein the authentication verification computer is configured to execute an overload control method according to a token bucket method.

8. A method for providing a mobile telecommunication service via a communication network configured to transmit messages based upon an Internet protocol, comprising:
transmitting a message via a multicast process within an access network for mobile computers;
connecting a plurality of access points in the access network to the communication network via a network connection computer, each access point having or being connected to an access point connection computer;
establishing a communication connection between the access network and a mobile computer to communicate with the access points;
establishing and managing trusted relationships between a plurality of communication elements of the communication network via the authentication verification computer;
executing at least one packet filtering method for security protection of the communication network at boundaries of the access network when receiving and transmitting messages via at least one of the network connection computer and at least one of the access point connection computers;
the at least one packet filtering method comprising at least one of a packet filtering method executed by the network connection computer and a packet filtering method executed by at least one of the access point connection computers;
the packet filtering method executed by the network connection computer comprising:
determining a source address of a message, and
rejecting the message if that message has at least one network connection rejection characteristic, the at least one network connection rejection characteristic being at least one of the source address of the message indicates that the message is from a mobile computer, the source address of the message indicates the message is from the access network, the source address of the message indicates the message is a MOMBASA-internal message, the message conforms to the Internet Group Management Protocol, and the message conforms to the Independent Multicast-Sparse Mode protocol; and
the packet filtering method executed by at least one of the access point connection computers comprising:
determining a source address of a message, and
rejecting the message if that message has at least one access point connection rejection characteristic, the at least one access point connection rejection characteristic being at least one of the source address identifying a non-mobile communication element that originates from a wireless link, message information that indicates the message arrives at an upstream interface and originates from a wireless link, and the message is an advertisement message from an access point that arrives at an input-side interface and originates from a wireless link; and
executing an overload control via the network connection computer and the authentication verification computer via a communication protocol for communication elements of the communication network in order to prevent malfunction of one of the communication elements as a result of an attack.

9. The method as claimed in claim 8, wherein the at least one packet filtering method is also comprised of a packet filtering method configured for repelling a predetermined class of attacks using deliberately changed source addresses is executed.

10. The method as claimed in claim 9, wherein the at least one packet filtering method is also executed for protection of an internal message exchange within the access network from external attacks.

11. The method as claimed in claim 8, wherein a distribution of keys to adjacent communication elements of an access point of the access network provides for a further access point to execute local authentication of a mobile computer while automatically tracking an existing useful data connection.

12. The method as claimed in claim 8, wherein the overload control is executed during an initial registration process of the mobile computer or while executing or updating paging services.

13. The method as claimed in claim 8, wherein the overload control is implemented by a Linux net filter architecture.

14. The method as claimed in claim 8, wherein the overload control is executed on a plurality of levels.

15. The method as claimed in claim 8, wherein the overload control is executed decentrally on a level of geographical cells.

16. The method as claimed in claim 8, wherein the overload control is executed centrally on a level of the total network load.

17. The method as claimed in claim 8, wherein the overload control is executed according to a token bucket method.

* * * * *